United States Patent [19]
Webster et al.

[11] Patent Number: 5,164,242
[45] Date of Patent: Nov. 17, 1992

[54] ELECTROMAGNETIC WAVE ATTENUATING AND DEICING STRUCTURE

[76] Inventors: Steven D. Webster, 2092 Wimpole Ct., Roanoke, Tex. 76262; Randy B. Williams, 2711 Edinboro Dr., Arlington, Tex. 76012

[21] Appl. No.: 678,285
[22] PCT Filed: Feb. 6, 1990
[86] PCT No.: PCT/US90/00589
  § 371 Date: Apr. 8, 1991
  § 102(e) Date: Apr. 8, 1991
[87] PCT Pub. No.: WO91/12173
  PCT Pub. Date: Aug. 22, 1991
[51] Int. Cl.⁵ .................................. B23B 9/00
[52] U.S. Cl. .................... 428/188; 428/198; 428/323; 428/328; 156/60
[58] Field of Search .......... 428/198, 188, 323, 328; 156/60

[56] References Cited

U.S. PATENT DOCUMENTS

| | | | |
|---|---|---|---|
| 2,342,979 | 2/1944 | Spicer | 244/134 |
| 3,307,186 | 2/1967 | Straub | 343/18 |
| 3,509,568 | 4/1970 | Manning et al. | 343/18 |
| 3,568,155 | 3/1971 | Wesch | 343/18 |
| 3,623,684 | 11/1971 | Kline | 244/134 A |
| 4,019,699 | 4/1977 | Wintersdorff et al. | 244/121 |
| 4,170,010 | 10/1979 | Reed | 243/18 A |
| 4,522,890 | 6/1985 | Volkers et al. | 428/624 |
| 4,595,442 | 6/1986 | Trares et al. | 156/286 |
| 4,613,102 | 9/1986 | Kageorge | 244/134 A |
| 4,687,155 | 8/1987 | Kageorge | 244/134 A |
| 4,706,911 | 11/1987 | Briscoe et al. | 244/134 A |
| 4,725,490 | 2/1988 | Goldberg | 428/292 |
| 4,784,449 | 5/1988 | Landers, Jr. et al. | 343/705 |

FOREIGN PATENT DOCUMENTS 9112173 8/1991 World Int. Prop. O.

OTHER PUBLICATIONS

"Microwave Absorbers" (undated).
(Publication, untitled and undated) pp. 253-258.
"Radar-Absorbing Material: A Passive Role in an Active Scenario," by Richard N. Johnson (undated).
Plessey Microwave (undated).

Primary Examiner—Patrick J. Ryan
Assistant Examiner—Abraham Bahta
Attorney, Agent, or Firm—Richards, Medlock & Andrews

[57] ABSTRACT

A composite structure (64) is disclosed for placement on an air, land or sea vehicle to attenuate electromagnetic waves and to break up ice accumulation which might occur under adverse weather conditions. The upper section (22) of the structure comprises a nonmagnetic, pneumatic deicer having a deformable sheet formed of a woven cloth substrate and a fluid-impervious resilient coating, and fluid passages for inflating the deicer section. The deicer section is attached to an underlying section (28) which provides electromagnetic wave attenuating properties. The lower section may be a dual band absorber having an upper elastomeric layer and a lower elastomeric layer loaded with magnetic particles, or the elastomeric deicer section may itself serve as the upper elastomeric layer with the magnetic particle layer.

22 Claims, 2 Drawing Sheets

ELECTROMAGNETIC WAVE ATTENUATING AND DEICING STRUCTURE

TECHNICAL FIELD OF THE INVENTION

This invention relates in general to a structure that prevents ice accumulation and which attenuates electromagnetic waves. In particular, this invention relates to a structure placed on an electrically conductive surface, for example the surface of an airplane or ship, which prevents ice accumulation through the use of a pneumatic deicer and which also attenuates electromagnetic waves through a dual band absorber, and which is weather and wear resistant.

BACKGROUND OF THE INVENTION

Electromagnetic wave attenuating material has commonly been placed on ships, planes, and other vehicles, particularly those used in the military, for several reasons. The radar system used on a ship generates radar signals. These radar signals may reflect off the ship's own structure, creating false echoes or ghost images. These false echoes may interfere with the proper navigation of the ship, for example, because of increased clutter on radar. These false echoes may also be represented as false targets on the radar. Electromagnetic wave attenuating material (also known as radar absorbing material) can be bonded to selective areas of the ship where reflection of the ship's radar signals commonly occurs. The electromagnetic wave attenuating material attenuates the radar signals, preventing back reflection.

Another application of electromagnetic wave attenuating material involves antenna radiation pattern shaping. The presence of conductive objects near an antenna can alter the established free space propagation characteristics of the antenna. However, placing electromagnetic wave attenuating material in those conductive areas near the antenna eliminates the problem. The use of electromagnetic wave attenuating material on ships, planes, and other vehicles also reduces the vehicle's cross-sectional area as seen by the radar. Reducing the radar cross section reduces the vehicle's signature, that is, its ability to be detected by radar.

Attenuation of electromagnetic waves is represented by the following equation:

$$\text{Attenuation (dB)} = 20 \log A/A_0$$

where $A_0$ is the original signal amplitude and $A$ is the signal amplitude after passing through the electromagnetic wave attenuating material. Attenuation generally occurs as a result of two mechanisms. One mechanism involves destructive interference between a first wave and a reflected second wave which is 180° out of phase with the first wave. Another attenuation mechanism occurs by the absorption of the electromagnetic wave energy.

With regard to the absorption of the electromagnetic wave energy, the energy of an electromagnetic wave is a function of the distance it travels through a medium, as represented by the following equation:

$$E(x) = E_o e^{-2x/\delta}$$

where $E_o$ is the original energy, $E(x)$ is the remaining energy, $x$ is the distance traveled in the medium and $\delta$ is the "skin depth." For a good conductor, $\delta$ is proportional to:

$$\frac{1}{\mu \sigma}$$

where $\mu$ is the magnetic permeability and $\sigma$ is the conductivity. Magnetic materials such as ferrites, iron and cobalt-nickel alloys are used to alter the permeabilities of materials. For example, the magnetic materials can be embedded in a rubber or elastomer. Increasing a material's magnetic permeability value increases the material's absorption of electromagnetic wave energy.

To achieve destructive interference between electromagnetic waves, typically a thin material is provided that is effectively one-fourth wavelength of the electromagnetic wave energy wavelength incident upon the material. The electromagnetic waves incident upon this material will be reflected or transmitted depending upon the properties of the material, as represented by the following equation:

$$R = \frac{1 - Z_1/Z_0}{1 + Z_1/Z_0}$$

where:
$Z_o = \mu_o/e_o$
$Z_l = \mu_l/e_l$ and where $\mu$ is the magnetic permeability and $e$ is the electric permittivity. Increasing the permeability of a material, such as by embedding magnetic particles in an elastomer, will cause electromagnetic waves to be partially reflected off of this material and partially transmitted through this material if the electromagnetic wave was traveling through a medium having a lower $Z_l$ (for example, if the permeability of the medium is lower than the permeability of the material). To achieve destructive cancellation of electromagnetic waves, a one-fourth wavelength material is used which has a higher permeability than the medium (typically the medium is air) through which the electromagnetic wave is traveling. This one-fourth wavelength material causes a reflected and transmitted wave. In practice, the one-fourth wavelength material is placed on a conductive backing so that the electromagnetic waves transmitted through the material will reflect off of the conductive backing. The transmitted electromagnetic wave, upon reflection from the conductive backing, will emerge 180° out of phase with the electromagnetic wave reflected by the one-fourth wavelength material. These reflected and emerging waves destructively interfere with each other, thereby resulting in cancellation.

One type of structure commonly used to cause electromagnetic wave attenuation is known as a dual band absorber. Dual band absorbers are generally made of two layers bonded together. The top layer, which may be loaded with magnetic particles, is typically an elastomer having a slightly higher permeability than free space, while the bottom layer is an elastomer having a higher concentration of magnetic particles embedded in it to increase the permeability above the value of the top layer. The dual band absorber is placed on a conductive backing. The top and bottom layers will also have electromagnetic wave energy absorbing properties, as noted above. These dual band absorbers, because of their composition, typically provide peak attenuation (greater than 20 dB) of the electromagnetic waves at two specific frequencies, while broadband absorption of 10-15 dB is generally obtained between the two null frequencies.

The electromagnetic wave attenuation performance of these materials, such as the dual band absorber, is adversely affected by accumulations of ice which can form thereon. Ice formation can also severely inhibit vehicle performance, particularly if it is an air vehicle. Heating the surface of the electromagnetic wave attenuating structure to remove ice would require placing a heat source underneath the electromagnetic wave attenuating layers so that the heat source would not interfere with the attenuation properties. Therefore, higher power is required from the heat source to provide enough thermal energy to deice the surface. Furthermore, the higher temperatures produced could be detrimental to the materials used in the electromagnetic wave attenuator. Heating sources such as electrothermal devices are effective at deicing, however, such devices are generally made of highly conductive materials which interfere with the attenuation performance of the electromagnetic wave attenuation layers.

One type of commercially available deicer which does not employ heat and which is not constructed with highly conductive materials is a pneumatic deicer, such as disclosed in Kageorge U.S. Pat. No. 4,687,159. These pneumatic deicers have a deformable sheet secured to the surface of the vehicle where ice accumulation is to be prevented. The deicer also has spaced, parallel, inextensible threads to define a series of inflatable sections in the deicer which may be alternately expanded and contracted by fluid pressure to break up ice accumulation. The pneumatic deicer does not, however, have electromagnetic wave attenuating properties.

Therefore, it is an object of this invention to provide a structure which, when placed on the surface of a vehicle, will attenuate electromagnetic waves and will eliminate ice accumulation on the surface of the structure so that ice will not interfere with the electromagnetic wave attenuation performance. It is a further object to provide a structure which can prevent ice accumulation and which attenuates electromagnetic waves over a particular frequency range. Another object is to provide an electromagnetic wave attenuating structure which can prevent ice accumulation and which has an outer layer which is weather and wear resistant.

SUMMARY OF THE INVENTION

This invention comprises a composite structure which can be placed on an air, land, or sea vehicle to attenuate electromagnetic waves, and which prevents ice accumulation on the vehicle subjected to such climatic conditions, without degrading the attenuation properties. The composite structure includes a pneumatic deicer section affixed over an electromagnetic wave attenuation section.

The composite structure includes a pneumatic deicer section adapted to break up ice accumulation on the surface of the structure. The pneumatic deicer section has a deformable sheet formed of a woven cloth substrate and a fluid-impervious, resilient coating. Inextensible threads are woven into the fabric in a spaced parallel array to define fluid passages therebetween. The passages may be coupled with a source of fluid such as air so that the deicer may be cyclically expanded and contracted to break up ice accumulation. An exterior cover ply is secured to the outer face of the deformable layer to expand and contract therewith and to add weather and wear resistance to the deicer. The periphery of the inner face of the deformable sheet may be secured to the structure through a base ply, or in the alternative it may be secured directly thereto without the inclusion of the base ply.

The bottom section of the composite structure to which the pneumatic deicer section is attached includes material exhibiting electromagnetic wave attenuating properties. In one embodiment, a dual band absorber is provided and comprises an upper elastomeric layer and a bottom elastomeric layer, both of which can be loaded with magnetic particles. Such dual band absorbers typically provide peak attenuation (greater than 20 dB) of electromagnetic waves at two specific frequencies, while broadband absorption of 10-15 dB is generally obtained between the two null frequencies. Because of the additional pneumatic deicer section formed on the attenuation section, the thicknesses of the various layers and the concentration of the magnetic loading in the bottom two elastomeric layers may have to be adjusted to achieve the desired electromagnetic wave attenuation. It is expected that the various layers of the composite structure may have to be made thinner, and the concentration of the magnetic particles may have to be decreased, in order to achieve the same electromagnetic wave attenuation performance as is achieved without the addition of the overlying pneumatic deicer section.

In the preferred embodiment, the upper elastomeric layer of the dual band absorber is eliminated. Since the pneumatic deicer is constructed primarily of elastomers it can function as a substitute for the upper elastomeric layer of the dual band absorber. Again, the thicknesses of the various layers and the concentration of the magnetic loading may have to be adjusted to achieve the desired electromagnetic wave attenuation performance. Experimentation with regard to the thicknesses and the concentration of the magnetic loading should achieve desirable electromagnetic wave attenuation.

BRIEF DESCRIPTION OF THE DRAWINGS

Further features and advantages will become apparent from the following detailed description of the preferred embodiment and other embodiments of the invention, as illustrated in the accompanying drawings in which like reference characters refer to the same elements or functions throughout the views, and in which.

DETAILED DESCRIPTION OF THE INVENTION

Figure 1:
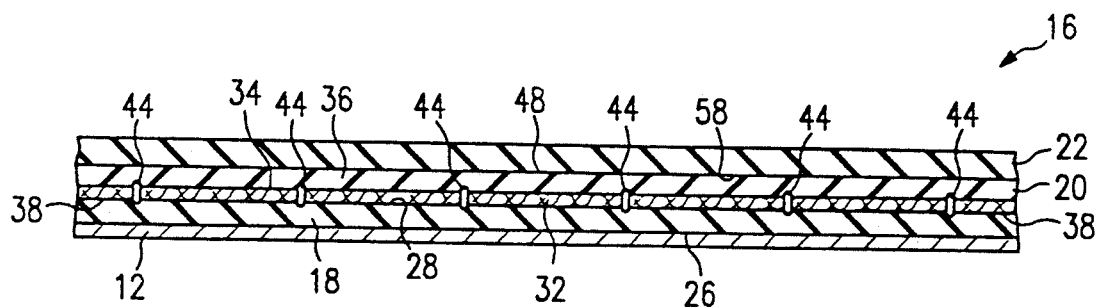
FIG. 1 is a cross-sectional view of a pneumatic deicer.

FIG. 1 illustrates the various layers of a pneumatic deicing device, as disclosed in U.S. Pat. No. 4,687,159, the disclosure of which is incorporated herein by reference. As discussed in the patent, the pneumatic deicer 16 is preferably formed of three main layers, each having an essentially constant, rectangular, cross-sectional configuration. The bottom layer or base ply 18 is the layer which is attached to the surface 12 on which the elimination of ice accumulation is desired. A deformable sheet 20 is positioned on top of base ply 18, while an exterior or cover ply 22 is placed on top of the deformable sheet 20.

Base ply 18 is formed of a sheet of fluid-impervious material, such as an elastomer, plastic or rubber, natural or synthetic, or blends thereof. The entire inner face 26 of the base ply 18 is adapted to be secured to the surface 12. When base ply 18 is secured in this manner, air or other fluid trapped outwardly of the outer face 28 of the base ply 18 by the deformable sheet 20 will not permeate or leak inwardly through any seam or other aperture in the surface 12, but rather will be retained between the base ply 18 and the deformable sheet 20 for the inflation and deflation of the pneumatic deicer 16.

The deformable sheet 20 is placed on top of the base ply 18. Deformable sheet 20 is formed of a stretchable or extensible fabric 32, preferably any known woven material formed of natural or synthetic thread so long as the fabric is capable of being stretched or extended during the inflation and deflation of the deicer. A resilient, elastomeric material is calendered or otherwise coated to the outer face 34 of the fabric 32 to constitute a coating 36. This coating serves two functions. The first function is to improve the ability of deformable sheet 20 to retain fluid, such as air, between it and the base ply 18 during inflation and deflation of the deicer. A second function of the coating is to cause deformable sheet 20 to return to its position flush with base ply 18 and the surface 12 when the pneumatic deicer is deflated.

The inner face 38 of the deformable sheet is left in its natural fabric state to preclude the intimate contact between the outer face 28 of the base ply 18 and the inner face 38 of the deformable sheet 20 when the deicer is being deflated. Such intimate contact would preclude the desired flow of fluid from the deicer by the entrapment of such evacuating fluid.

Provided within the deformable sheet are strands of essentially inextensible threads 44 to minimize, reduce or abate the extension of the deformable sheet 20 whenever pressure from an inflating fluid is provided to the inner face 38 of the deformable sheet 20. These threads 44 are constructed of any known material capable of being formed into threads and which will resist elongation under applied pressure.

Figure 2:
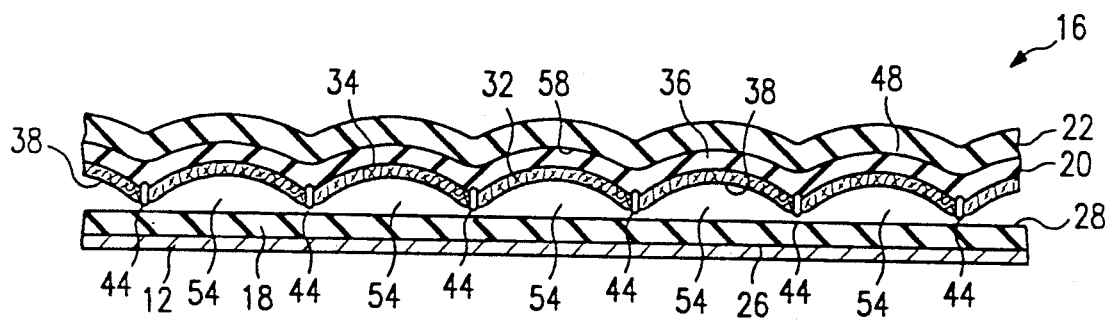
FIG. 2 is a cross-sectional view of the pneumatic deicer in FIG. 1, shown in an inflated condition.

When a fluid is introduced inwardly of the deformable sheet 20, the inflating pressure tends to urge the deformable sheet outwardly, and when the deformable sheet so moves it acts to straighten the bends or "crimp" in the inextensible threads 44 and slightly increase their length from end to end to allow slight outward movement of the deformable sheet in the regions corresponding to these essentially inextensible threads. This orientation and positioning of the deformable sheet 20 and inextensible threads 44 is shown in FIG. 2. Deflation of the deicer 16 will allow the cover ply 22 and deformable sheet 20 to return to their rest positions and orientation flat against the base ply 18. A negligible degree of extension of the deformable sheet 20 along the lines of these inextensible threads 44 will occur during inflation. Such negligible extension of the deformable sheet 20 is not undesirable since it will allow the inflating fluid to flow from one passage 54 to the next adjacent passage when the deformable sheet is inflated in regions 52 which are between regions 54. The use of separate zones of inflation between noninflatable zones results in an undulating pattern of expansion and contraction which has been found to be particularly effective in performing the deicing function.

The cover ply 22 is of the same size and shape as the deformable sheet 20 and base ply 18. It could also be slightly larger in order to insure the total covering of the two layers 20 and 18. The entire inner face 58 of cover ply 22 is cemented to the outer face 48 of the deformable sheet 20 for concurrent expansion and contraction therewith. Cover ply 22 is preferably formed of a resilient, extensible material to expand and contract with the deformable sheet 20. It is also of a material selected to improve the weather and wear resistant properties of the pneumatic deicer 16.

Securement of the various deicer layers together and securement of the pneumatic deicer to the surface 12 may be accomplished by any of the known cements or other bonding agents compatible with the materials employed.

A fluid communication means (not shown) is provided to couple the inflatable passages 54 of the deicer 16 so as to introduce or evacuate fluid such as air from the passages during inflation and deflation of the deicer in a continuous cycle of operation. It is this cycling, including the expansion and contraction of the inflatable passages 54 and the inflation and deflation of the pneumatic deicer 16 itself, which will break up any ice formation.

In an alternative embodiment (not shown) the base ply 18 is eliminated. Base ply 18 is normally necessary for proper operation when the surface to which the deicer 16 is attached is formed such that it may have apertures, imperfect seams, spaces, adjacent rivets, or the like, which may act as a conduit for allowing the escape of fluid from the inflatable passages 54 of the deicer. If, however, the surface to which the pneumatic deicer 16 is attached is totally impervious to the flow of fluid therethrough, the bottom periphery of deformable sheet 20 may be bonded directly to the surface. The flow of fluid to the inflatable passages 54 between the deformable sheet 20 and the fluid-impervious structure is as effective and as fluid impervious as the pneumatic deicer having the base ply 18.

As discussed below in connection with the invention, a pneumatic deicer section 16 is placed on the surface of an electromagnetic wave attenuating section. The pneumatic deicer section 16 will not interfere with the electromagnetic wave attenuating properties of the underlying material and may even enhance the electromagnetic wave attenuating performance. The pneumatic deicer section 16 is commercially available from the B. F. Goodrich Company. The following product designations identify the pneumatic deicers manufactured by B. F. Goodrich Company which are suitable for this invention: types 21, 21S, 22, 22S, 25S, 27S, 29S, 35S and 37S. Other devices may be employed with the invention with equal effectiveness.

Figure 3:
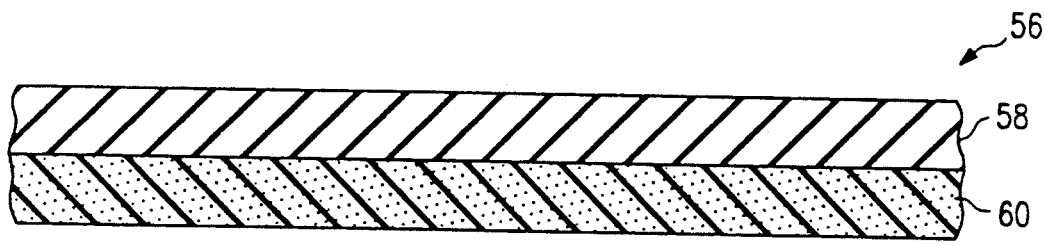
FIG. 3 is a cross-sectional view of a dual band absorber.

FIG. 3 illustrates a dual band absorber section 56 of the type discussed above. As noted above, the dual band absorber section 56 preferably has two layers. The top layer 58 is typically an elastomer such as polyisoprene, neoprene, nitrile, fluoroelastomer, silicone, or urethane or other suitable material. The bottom layer 60 is also made from one of these elastomers except that the elastomeric layer is loaded or embedded with such magnetic particles. As noted above, the top layer may or may not be loaded with magnetic particles. The bottom elastomeric layer is typically loaded 70-90% by weight with such magnetic particles. The magnetic particles should be uniformly distributed throughout the elastomer to prevent anisotropy. Carbonyl iron or ferrites are effective for use as the magnetic particles. GAF Corporation supplies carbonyl iron type E particles which are suitable for use with the layer 60 of the dual band absorber section. Layers 58 and 60 are fabricated separately and then joined together by either adhesive bonding or co-vulcanizing. Suitable dual band absorbers of the type described above, are manufactured by Plessey Microwave Corporation.

Figure 7:
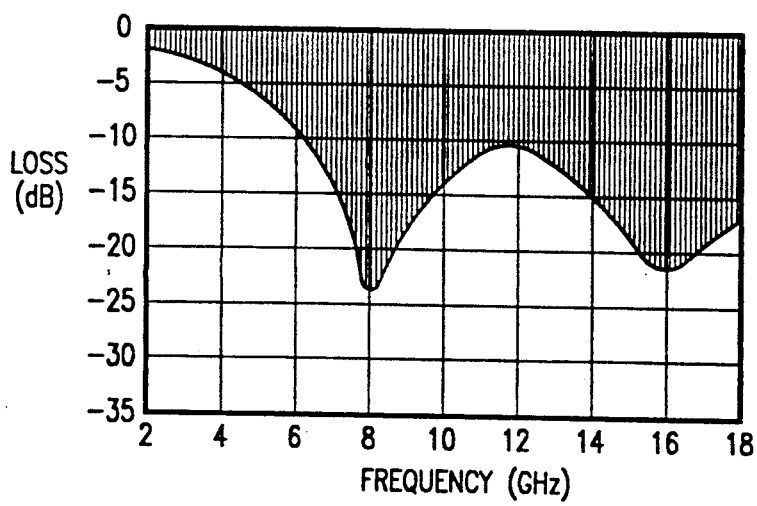
FIG. 7 is a graph representing electromagnetic wave attenuation performance for a particular frequency range.

As discussed above, dual band absorbers generally require a conductive backing to reflect the electromagnetic waves. Typically, the dual band absorber is adhesively attached to the metallic or electrically conductive base of a vehicle which satisfies the conductive backing requirement. Once the dual band absorber is in place, it provides broadband electromagnetic wave attenuation performance. Preferably, the dual band absorber provides peak absorption (greater than 20 dB absorption) at two specified frequencies, while absorption of between 10 to 15 dB is generally obtained between the two nulls. FIG. 7 illustrates the characteristic attenuation performance of a dual band absorber for a specified frequency range.

The overall thickness of the dual band absorber section 56 depends upon the range of frequencies that are desired to be attenuated. For attenuation of lower frequencies, the dual band absorber section 56 should be thicker, while for attenuation of higher frequencies, the dual band absorber section 56 should be thinner. The typical overall thickness of the dual band absorber section 56 is between 0.150 inch to 0.250 inch.

Figure 4:
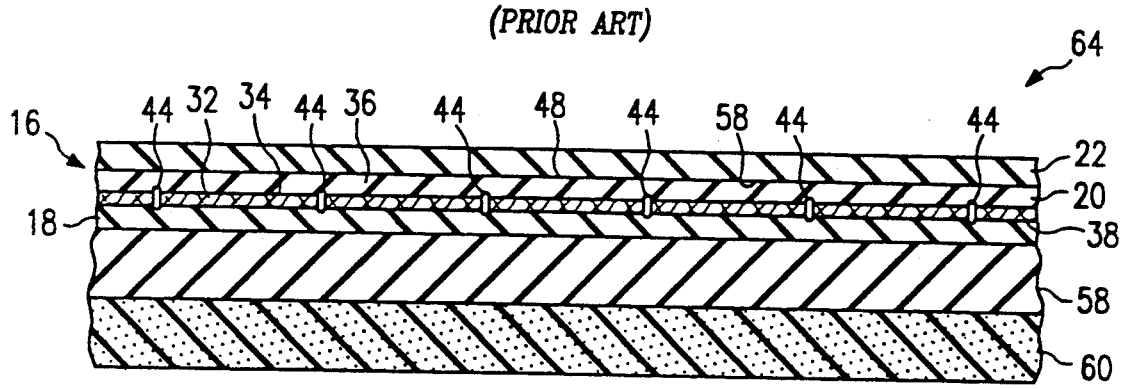
FIG. 4 is a cross-sectional view which illustrates an electromagnetic wave attenuating deicing structure according to one embodiment of the invention.

FIG. 4 illustrates a pneumatic deicer section 16 affixed to a dual band absorber section 56. Although pneumatic deicers and dual band absorbers are known separately in the art, it is not known, as is taught by this invention, to combine a pneumatic deicer with a dual band absorber to form a composite structure. Placing a nonconductive pneumatic deicer section 16 on top of a dual band absorber section 56 does not substantially change the electromagnetic wave attenuating properties of the underlying dual band absorber. As discussed above, the pneumatic deicer section 16 selected according to the invention is made of materials such as nonmagnetic elastomers and fabrics which have low electrical permittivity values. However, the pneumatic deicer section 16 preferably exhibits an electrical permittivity value which is greater than the electrical permittivity value of air, and the pneumatic deicer adds thickness to the overall composite structure 64. Thus, the electromagnetic wave attenuating performance of overall composite structure 64 will be different from the dual band absorber section 56 by itself, due primarily to the added thickness and electrical permittivity value of the pneumatic deicer section 16. Since the change in the electromagnetic wave attenuating performance will not be substantial, the magnetic particle loading in the bottom layers 58 and 60 and the thicknesses of the various layers can be adjusted to achieve the desired electromagnetic wave attenuation performance. It is expected that the concentration of magnetic particles will have to be adjusted to less than their concentration in dual band absorber section 56 to achieve the same electromagnetic wave attenuation performance as existed before the addition of pneumatic deicer section 16. It is also expected that the various layers will have to be made thinner to achieve the same electromagnetic wave attenuation performance in view of the added thickness of pneumatic deicer section 16. However, the thickness or magnetic loading of the dual band absorber section 56 might not require adjusting if adding the pneumatic deicer section 16 achieves the desired electromagnetic wave attenuation performance. Pneumatic deicer section 16 will likely be attached to dual band absorber section 56 by adhesive bonding or co-vulcanizing.

Figure 5:
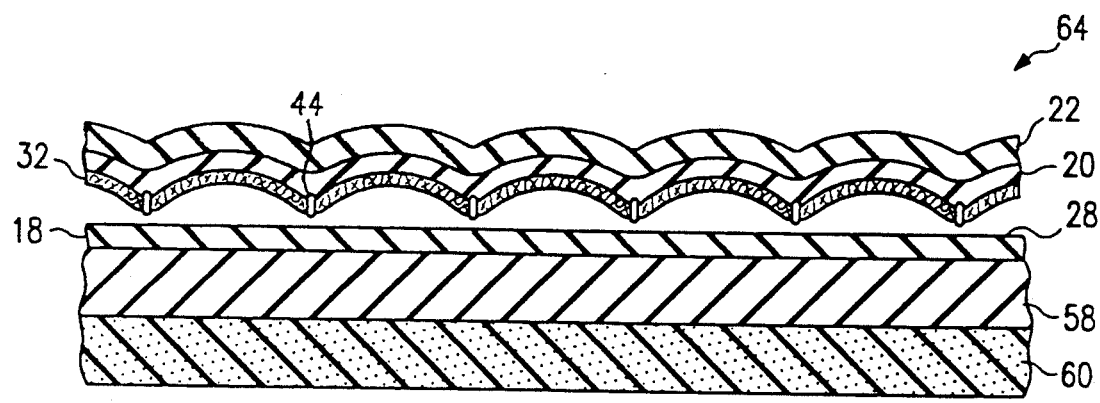
FIG. 5 illustrates the embodiment shown in FIG. 4, with a pneumatic deicer in an inflated condition.

Once the desired electromagnetic wave attenuation performance of composite structure 64 is achieved, the structure is ready for attachment to the vehicle requiring electromagnetic wave attenuation. The composite structure 64 will typically be adhesively bonded to the vehicle. As described, bottom layer 60 of the dual band absorber section 56 is preferably affixed to a conductive backing. The base support of the vehicle to which the composite structure 64 is attached is typically metallic. Once the composite structure 64 is attached, it will provide the desired electromagnetic wave attenuation performance, as well as deicing capabilities. If the vehicle equipped with the composite structure 64 encounters weather conditions resulting in ice formation, inflation and deflation of the pneumatic deicer section 16 of the composite structure 64 will be effective to break any ice formation on and around the exposed surface. FIG. 5 illustrates the composite structure in its inflated state. During the inflation and deflation of the pneumatic deicer section 16, composite structure 64 will provide electromagnetic wave attenuation, although the attenuation will not be the most desirable. Once the ice is eliminated, pneumatic deicer section 16 is deflated back to its original or rest position, wherein the overall composite structure 64 will once again have its desired electromagnetic wave attenuating properties.

Figure 6:
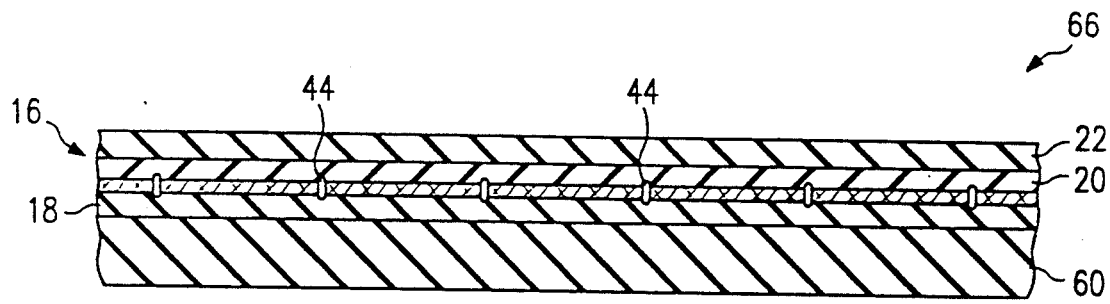
FIG. 6 illustrates an electromagnetic wave attenuating deicing structure according to another embodiment of the invention.

FIG. 6 illustrates what is contemplated as the preferred embodiment of this invention. In this embodiment, the overall composite structure 66 is generally the same as the composite structure 64 in the embodiment in FIGS. 4-5, except that the top layer 58 of the dual band absorber section 56 has been eliminated. Pneumatic deicer section 16 will likely be attached to layer 60 by adhesive bonding or co-vulcanizing. It is expected that the overall composite structure 66 can provide the desired electromagnetic wave attenuation performance without the need for layer 58. Since the pneumatic deicer section 16 is comprised primarily of elastomers, it can be utilized functionally as a substitute for layer 58, which is an elastomer, so that both the pneumatic deicer section and bottom layer 60 function overall as a dual band absorber Since the composition of pneumatic deicer section 16 is not exactly the same as top layer 58 described above, it might be necessary to modify the thicknesses of the pneumatic deicer section and/or the layer 60. Furthermore, the magnetic particle loading concentration may also be altered to optimize performance. As noted above, once the desired electromagnetic wave attenuating performance is achieved, composite structure 66 can be placed on a vehicle. If ice accumulation occurs, pneumatic deicer section 16 can be inflated and deflated in the same manner as already discussed, to break up the ice accumulation.

The overall thickness of composite structures 64 or 66 is expected to be between 0.125 inch to 0.3 inch.

Composite structure 66 will probably be thinner than composite structure 64, as the former structure does not have layer 58. The thicknesses of structures 64 and 66 will also depend on the desired range of frequencies to be attenuated. A thicker structure will be used to attenuate lower frequencies, while a thinner structure will be used to attenuate higher frequencies.

FIG. 7 illustrates typical electromagnetic wave attenuation performance that is expected from composite structures 64 and 66. As can be seen, peak attenuation performance of greater than 20 dB is achieved at approximately the 8 GHz and 16 GHz frequency points. It is expected that by experimenting with the overall thicknesses, and the composition, especially with regard to magnetic loading, the position of the two attenuation nulls can be shifted to any two desired frequencies, while still maintaining a minimum of 10 dB attenuation between nulls.

While the foregoing illustrates and discloses the preferred and other embodiments of the invention with respect to the composition of electromagnetic wave attenuation deicing structures, it is to be understood that many changes can be made in the composition and thickness of the structures, and the application of the structures as a matter of engineering choices, without departing from the spirit and scope of the invention, as defined by the appended claims. For example, the foregoing discloses the attachment of the composite structure to a vehicle, however, it may be found that in certain instances it may be advantageous to first attach the electromagnetic wave attenuation section to a vehicle or other object, and then attach or bond the deicing section to the attenuation section. Also, deicing structures can be attached to single band electromagnetic absorbers to accomplish the advantages described above.

What is claimed is:

1. An electromagnetic wave attenuating and deicing composite structure for attachment to an electrically conductive base, comprising:
    a first nonmetallic section having inflatable portions such that when inflated, said portions expand, and when said portions are deflated, said portions contract, the expansion and contraction of said first section being effective to break up ice accumulation on a top surface of said first section; and
    a second section attached to said first section, and said second section being adapted for attachment to said conductive base, said second section comprising a magnetic material having electromagnetic wave attenuating properties, said second section providing, with said first section contributing at least in part, for the attenuation of electromagnetic waves independent of whether the first section is inflated or deflated.

2. An electromagnetic wave attenuating and deicing composite structure in accordance with claim 1, wherein the composition of the material of said second section and the thicknesses of said first and second section are a function of the electromagnetic wave attenuation that is desired.

3. An electromagnetic wave attenuating and deicing composite structure in accordance with claim 1, wherein said first section is affixed to said second section by adhesive bonding.

4. An electromagnetic wave attenuating and deicing composite structure in accordance with claim 1, wherein said first section is affixed to said second section by co-vulcanizing.

5. The electromagnetic wave attenuating and deicing composite structure in accordance with claim 1, wherein said first section comprises a layered structure being fastened at spaced-apart locations to a nonmovable base such that when inflated, areas of said first section intermediate the fastened areas bow outwardly and form an irregular surface for removing ice formed thereon.

6. An electromagnetic wave attenuating and deicing composite structure for attachment to an electrically conductive base, comprising:
    a first nonmetallic section having inflatable portions such that when inflated, said portions expand, and when said portions are deflated, said portions contract, the expansion and contraction of said first section being effective to break up ice accumulation on a top surface of said first section; and
    a second section attached to a bottom surface of said first section, and said second section being adapted for attachment to said conductive base, said second section comprising an elastomer loaded with magnetic particles to produce a magnetic absorption of the electromagnetic waves, said first section and said second section functioning together to attenuate electromagnetic waves in a manner independent of whether said first section is inflated or deflated.

7. An electromagnetic wave attenuating and deicing composite structure in accordance with claim 6, wherein the concentration of said magnetic particles and the thicknesses of said first and second section are a function of the electromagnetic wave attenuation that is desired.

8. An electromagnetic wave attenuating and deicing composite structure in accordance with claim 6, wherein said first section is affixed to said second section by adhesive bonding.

9. An electromagnetic wave attenuating and deicing composite structure in accordance with claim 6, wherein said first section is affixed to said second section by co-vulcanizing.

10. An electromagnetic wave attenuating and deicing composite structure for attachment to an electrically conductive base, comprising:
    a first section having inflatable portions such that when inflated, said portions expand while other portions do not expand so that an exterior surface defines an irregular surface, and when said portions are deflated, said portions contract to define a substantially regular surface, the expansion and contraction of said first section being effective to break up ice accumulation on a top surface of said first section; and
    a second magnetic attenuating section attached to a bottom surface of said first section, and said second section being adapted for attachment to said conductive base for reflecting electromagnetic waves back into the second section, said second section comprising a dual band absorber having an upper elastomeric layer, and a lower elastomeric layer loaded with magnetic particles so that an electrical permeability thereof is greater than an electrical permeability of the upper elastomeric layer, said first section and said second section contacting each other about a substantial area thereof and functioning together as a dual band absorber to attenuate electromagnetic waves.

11. An electromagnetic wave attenuating and deicing composite structure in accordance with claim 10, wherein the concentration of said magnetic particles and the thicknesses of said first section and the layers of said second section is a function of the desired electromagnetic wave attenuation.

12. An electromagnetic wave attenuating and deicing composite structure in accordance with claim 10, wherein said first section is affixed to said second section by adhesive bonding.

13. An electromagnetic wave attenuating and deicing composite structure in accordance with claim 10, wherein said first section is affixed to said second section by co-vulcanizing.

14. A method for fabricating an electromagnetic wave attenuating and deicing composite structure for attachment to an electrically conductive base, comprising the steps of:
fabricating a first section with a deformable material and fastening a layer of the first section at spaced-apart locations to a stationary base so that when inflated, an outer surface of the first section defines an irregular contoured surface to remove ice, and when deflated said outer surface relaxes to a substantially regular surface;
fixing together said first section to a second section to form said composite structure;
said first section being nonmetallic and being inflatable for expansion and contraction to break up ice accumulation on a top surface of said first section; and
said second section being adapted for attachment to said conductive base, said second section comprising a magnetic absorber having electromagnetic wave attenuating properties, said second section providing, with said first section contributing at least in part, for the attenuation of electromagnetic waves.

15. The method of claim 14, further including selecting the composition of the material of said second sections and the thicknesses of said first and second section to achieve a desired electromagnetic wave attenuation.

16. The method of claim 14, further including fixing said first section to said second section by adhesively bonding said sections together.

17. The method of claim 14, further including fixing said first section to said second section by co-vulcanizing said sections together.

18. The method of claim 14, further including selecting materials for said first section and said second section so that the composite structure functions as a dual band absorber.

19. The method of claim 18, further including selecting materials of said first section, which defines said deicer section, such that it exhibits an electrical permittivity higher than that of free space, and selecting a material of said second section, to have higher electrical permittivity than that of said first section, whereby both said sections function as a deicer adapter for attenuating electromagnetic waves.

20. The method of claim 19, further including selecting said first section to include elastomeric layers, and forming said second section with embedded particles which function to increase the permeability of said second section.

21. The method of claim 14, further including adhering said composite structure to said conductive base.

22. A composite structure fabricated in accordance with the method of claim 19 in which the material of said section includes a magnetic material for attenuating the electromagnetic waves.

* * * * *

UNITED STATES PATENT AND TRADEMARK OFFICE
CERTIFICATE OF CORRECTION

PATENT NO. : 5,164,242
DATED : November 17, 1992
INVENTOR(S) : Webster, et al

It is certified that error appears in the above-indentified patent and that said Letters Patent is hereby corrected as shown below:

Title Page, Item [86]:

After "§ 371 Date:", delete "April 8, 1991", and insert therefor --February 6, 1990--.

After "§ 102(e) Date:", delete "April 8, 1991", and insert therefor --February 6, 1990--.

Signed and Sealed this

Eighth Day of March, 1994

Attest:

BRUCE LEHMAN

Attesting Officer

Commissioner of Patents and Trademarks